US006529548B1

(12) United States Patent
Aoki et al.

(10) Patent No.: US 6,529,548 B1
(45) Date of Patent: Mar. 4, 2003

(54) DEVICE AND METHOD FOR DETECTING DATA COMMUNICATION PROPERTY

(75) Inventors: Yoshiyuki Aoki, Tokyo (JP); Tomohiro Kitayama, Tokyo (JP); Junya Tsuchida, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/534,167

(22) Filed: Mar. 24, 2000

(30) Foreign Application Priority Data

Mar. 25, 1999 (JP) .......................................... 11-082529

(51) Int. Cl.$^7$ .......................... H04B 17/00; H04B 3/46; H04Q 1/20
(52) U.S. Cl. ....................................... 375/224; 370/252
(58) Field of Search ................................. 375/259, 316, 375/219, 220, 222, 224, 225, 260; 370/276, 402, 252; 379/247, 224, 233, 106.4

(56) References Cited

U.S. PATENT DOCUMENTS

| 3,921,137 A | * | 11/1975 | McClean, Jr. et al. ...... 370/443 |
| 4,896,317 A | * | 1/1990 | Nakama et al. .............. 370/434 |
| 4,995,058 A | * | 2/1991 | Byers et al. ............. 340/855.5 |
| 5,274,679 A | | 12/1993 | Abe et al. |
| 5,469,545 A | * | 11/1995 | Vanbuskirk et al. ......... 709/234 |
| 5,905,716 A | * | 5/1999 | Vidales ........................ 370/276 |
| 5,923,705 A | * | 7/1999 | Willkie et al. .............. 375/220 |
| 5,982,837 A | * | 11/1999 | Earnest ....................... 375/377 |
| 6,072,827 A | * | 6/2000 | Krulce ........................ 375/225 |

FOREIGN PATENT DOCUMENTS

| JP | 60-132448 | 7/1985 |
| JP | 1-305644 | 12/1989 |
| JP | 2-65347 | 3/1990 |
| JP | 4-334239 | 11/1992 |
| JP | 5-191470 | 7/1993 |
| JP | 7-321856 | 12/1995 |
| JP | 9-153923 | 6/1997 |
| JP | 10-294772 | 11/1998 |
| JP | 11-55231 | 2/1999 |

* cited by examiner

Primary Examiner—Jean Corrielus
(74) Attorney, Agent, or Firm—Foley & Lardner

(57) ABSTRACT

A baud rate detector detects baud rate of received serial data based on an AT command included in the serial data. A character discriminator detects parity type and data format of the serial data based on the AT command in the serial data. An information relay 16 sets the baud rate, the parity type and the data format to a register in a UART (Universal Asynchronous Receiver-Transmitter). A clock generator generates a clock signal for data reception and supplies the clock signal to the UART.

16 Claims, 8 Drawing Sheets

DEVICE AND METHOD FOR DETECTING DATA COMMUNICATION PROPERTY

This application is based on Japanese Patent Application No. H11-082529 filed on Mar. 25, 1999 and including specification, claims, drawings and summary. The disclosure of the above Japanese Patent Application is incorporated herein by reference in its entirety.

For data communications between computers such as PC (Personal Computers), the terminals send and receive start-and-stop synchronous AT commands for controlling communication devices such as a modem and terminal adapter (TA). The term "AT command" generally refers to any instructions) sent to a communication device that begin with "AT." The letters "AT" generally refer to letters that get the communication device's attention that you are about to send it a command. The communication device includes a circuit called UART (Universal Asynchronous Receiver-Transmitter) which receives the start-and-stop synchronous AT commands, and proceed communication in accordance with the received AT command.

BACKGROUND OF THE INVENTION

1. Field of the Invention

The present invention relates to a device and a method for detecting data communication properties applied to received data based on received AT command.

2. Description of the Related Art

In a case where baud rate of the communication depends on the terminal's ability for communication, suitable baud rate for the UART should be selected before proceeding communication. Various methods for selecting appropriate baud rate have been proposed.

For example, Unexamined Japanese Patent Application KOKAI Publication No. H10-294772 discloses a technique for detecting baud rate of received data based on length of a start bit of a first character. Based on the detected baud rate, a clock signal for reception is generated and supplied to the UART. Further, data bits following to the start bit which represent the first characterare stored in a shift register, and data bits representing a second character and following-characters are supplied to the UART. According to this structure, a term required for receiving the first character is fully used for setting baud rate to the UART. That is, a CPU can read the data for the first character from the shift register while the baud rate is being set to the UART. Thus, the baud rate setting and data reception can be done simultaneously, and it realizes successful detection of the start bit without delay in a case where intervals among commands are very short in high baud rate communication.

Unexamined Japanese Patent Application KOKAI Publication No. H09-153923 discloses a technique which realizes the baud rate detection, clock generation and.clock transfer to the UART without MPU processing. Further, bits having the same level as the start bit are always monitored, and baud rate detection starts unless successive at least 10 bits (1 bit for start bit, 7 bits for data bit, 1 bit for parity bit, and 1 bit for stop bit) whose level differs from start bit level appear. As a result, errors in baud rate detection are reduced.

In above described techniques, a CPU discriminates whether received data is AT command or not after reading data representing a first character in the shift register and receives following data via the UART. Once an AT command is received, that is, the received first and second characters are "AT" (or "at"), the CPU determines data format for the communication based on parity bits in data packets for the first and second characters.

Accordingly, the above conventional techniques requires CPU processing for controlling data communication. Since data packets representing commands successively arrive in high baud rate communication (for example, 1Mbps or faster), data reception is likely to fail if the CPU is occupied for other processing.

In a case where data communication is performed by a mobile terminal such as a mobile phone, a CPU should not work filly for the data communication in order to save batteries.

SUMMARY OF THE INVENTION

The present invention has been made in consideration of the above problems. It is an object of the present invention to provide a device and a method for detecting baud rate, parity, and data format to be set to a universal asynchronous receiver-transmitter without CPU processing.

According to a first aspect of the present invention, it is provided a method of detecting data communication property which is applicable to a device for receiving serial data and transferring the received serial data to a connected universal asynchronous receiver-transmitter, the method comprises:

receiving the serial data;

discriminating whether the serial data include an AT command;

detecting data communication property including baud rate of the received serial data, parity type, and data format, based on the received AT command;

generating a clock signal for receiving the serial data based on the detected baud rate and supplying the generated clock signal to the universal asynchronous receiver-transmitter; and setting the detected data communication property to the universal asynchronous receiver-transmitter.

The above described method enables the device for receiving the serial data to detect the baud rate, the parity type, and the data format based on the AT command, and the detected information are set to the UART. Therefore, the UART can receive the serial data in accordance with the information without CPU processing.

In this case, the detecting may comprise detecting first and second characters represented by the serial data to discriminate whether the input characters represent the AT command; and checking parity bits for the first and second characters of the AT command to detect the parity type and the data format based on level of the parity bits, and the generating generates the clock signal when the discriminating discriminates that the input characters represent the AT command, and quits generating the clock signal when the discriminating discriminates a last character of the AT command.

The method may further comprise monitoring whether the serial data is supplied while measuring a time period during an interval of the data supply, and quitting the baud rate detection when the measured time period exceeds a predetermined time period.

By thus structured method, the clock signal is not generated until the AT command is received. As a result, power consumption for the clock signal generation while standing by for the AT command arrival is reduced. Moreover, the baud rate detection rests when no serial data is supplied for the predetermined time period. As a result, more effective power saving is realized.

According to a second aspect of the present invention, it is provided a device for detecting data communication property which receives serial data and transfers the received serial data to a connected universal asynchronous receiver-transmitter, the device comprises;

at least one input terminal which receives externally supplied start-and-stop serial data;

a character discriminator which discriminates whether input characters in the received serial data represent the AT command;

a baud rate detector which detects, if the character discriminator discriminates that the input characters represent the AT command, a first data communication property including baud rate of the received serial data by measuring a start bit for a first character of the AT command in the received serial data;

a clock generator which generates a clock signal for data reception based on the detected baud rate, and supplies the generated clock signal to the universal asynchronous receiver-transmitter, a property detector which detects, if the character discriminator discriminates that the input characters represent the AT command, a second data communication property including parity type and data format of the received serial data, based on the AT command;

an information relay which receives information representing the first and second communication properties from the baud rate detector and the property detector, and sets the received information to the universal asynchronous receiver-transmitter; and a gate which stops flow of the serial data to the universal asynchronous receiver-transmitter while the first and second characters of the AT command are being input.

The above described device can detect the baud rate, the parity type, and the data format based on the received AT command, and set thus detected information to the UART. Moreover, the serial data representing the first and second characters of the AT command are not supplied to the UART. Thus, the UART can receive the serial data representing characters following to the second character of the AT command in accordance with the information without CPU processing.

In this case, the character discriminator may detect first and second characters represented by the serial data to discriminate whether the input characters represent the AT command, and the property detector checks parity bits for the first and second characters of the AT command to detect the second data communication property based on level of the parity bits.

Moreover, the character discriminator may supply an instruction signal to the clock generator to generate a clock signal for data reception when the character discriminator discriminates that the received serial data represent the AT command, and the character discriminator quits supplying the instruction signal and discriminates whether a further AT command is received when the character discriminator detects a last character of the AT command; and the clock generator generates the clock signal for the data reception in response to the instruction signal supplied by the character discriminator, and quits generating the clock signal when the supply of the instruction signal is stopped.

The device may further comprise a timeout detector which monitors whether the serial data is supplied while measuring a time period during an interval of the data supply, and controls the baud rate detector to quit the baud rate detection when the measured time period exceeds a predetermined time period.

In thus structured device, the clock generator does not generate the clock signal until the AT command is received. As a result, power consumption at the clock generator while standing by for the AT command arrival is reduced. Moreover, the baud rate detection by the baud rate detector rests when no serial data is supplied for the predetermined time period. As a result, more effective power saving is realized.

According to a third aspect of the present invention, it is provided a method of detecting data communication property which is applicable to a device for receiving an infrared signal representing serial data and transferring the received serial data to a connected universal asynchronous receiver-transmitter, the method comprises:

receiving an infrared signal representing the serial data;

modulating the infrared signal to output the serial data;

discriminating whether the serial data in the modulated infrared signal include an AT command;

detecting a data communication property including baud rate of the received serial data, parity type, and data format, based on the received AT command;

generating a clock signal for receiving the serial data and supplying the generated clock signal to the universal asynchronous receiver-transmitter when the discriminating discriminates that the received serial data include the AT command; and setting the detected data communication property to the universal asynchronous receiver-transmitter.

The above described method enables the device for receiving the infrared signal representing the serial data. And the method enables modulation of the infrared signal to output the serial data. The baud rate, the parity type, and the data format are detected based on the received serial data, and the detected information are set to the UART. Therefore, the UART can receive the serial data in form of the infrared signal in accordance with the information without CPU processing.

In this case, the detecting may comprise detecting first and second characters represented by the serial data to discriminate whether the input characters represent the AT command; and checking parity bits for the first and second characters of the AT command to detect the parity type and the data format based on level of the parity bits, and the generating generates the clock signal when the discriminating discriminates that the input characters represent the AT command, and quit generating the clock signal when the discriminating discriminates a last character of the AT command.

The method may further comprise:

monitoring whether the serial data modulated by the modulating are output while measuring a time period during an interval of the data output, and quitting the baud rate detection when the measured time period exceeds a predetermined time period.

By thus structured method, the clock signal is not generate until the AT command is received. As a result, power consumption for the clock signal generation while standing by for the AT command arrival is reduced. Moreover, the baud rate detection rests when no modulation is carried out for the predetermined time period. As a result, more effective power saving is realized.

According to a fourth aspect of the present invention, it is provided a device for detecting data communication property which receives serial data and transfers the received serial data to a connected universal asynchronous receiver-transmitter, the device comprises;

at least one input terminal which receives an externally supplied infrared signal representing start-and-stop serial data;

a demodulator which demodulates the infrared signal to output the serial data;

a character discriminator which discriminates whether input characters in the received serial data represent the AT command;

a baud rate detector which detects a first data communication property including baud rate of the serial data output by the demodulator;

a clock generator which generates a clock signal for data reception based on the detected baud rate, and supplies the generated clock signal to the universal asynchronous receiver-transmitter, a property detector which detects, if the character discriminator discriminates that the input characters represent the AT command, a second data communication property including parity type and data format of the received serial data, based on the AT command;

an information relay which receives information representing the first and second data communication properties from the baud rate detector and the property detector, and sets the received information to the universal asynchronous receiver-transmitter; and a gate which stops flow of the serial data to the universal asynchronous receiver-transmitter while the first and second characters of the AT command are being input.

The above device modulates a received infrared signal representing the serial data, and outputs the serial data to the UART. The device also detects the baud rate, the parity type, and the data format based on the infrared signal and the AT command, and sets thus detected information to the UART. Therefore, the UART can receive the serial data represented by the infrared signal in accordance with the information without CPU processing.

In this case, the baud rate detector may measure a time period between a first pulse and a second pulse of the infrared signal, and divides the measured time period in half to obtain the baud rate;

the character discriminator detects the first and second characters represented by the received serial data to discriminate whether the input characters represent the AT command, and the property detector checks parity bits for the first and second characters of the AT command, and detects a second data communication property including the parity type and the data format based on level of the parity bits.

Moreover, the character discriminator may supply an instruction signal to the clock generator to generate a clock signal for data reception when the character discriminator discriminates that the received serial data represent the AT command, and the character discriminator quits supplying the instruction signal and discriminates whether a further AT command is received when the character discriminator detects a last character of the AT command; and the clock generator generates the clock signal for the data reception in response to the instruction signal supplied by the character discriminator, and quits generating the clock signal when the supply of the instruction signal is stopped.

The device may further comprise a timeout detector which monitors whether the demodulator outputs the serial data while measuring a time period during an interval of the data output, and controls the baud rate detector to quit the baud rate detection when the measured time period exceeds a predetermined time period.

In thus structured device, the clock generator does not generate the clock signal until the AT command is received. As a result, power consumption at the clock generator while standing by for the AT command arrive is reduced. Moreover, the baud rate detection by the baud rate detector rests when no serial data is supplied for the predetermined time period. As a result, more effective power saving is realized.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

A first embodiment of the present invention will now be described with reference to accompanying drawings.

Figure 1:
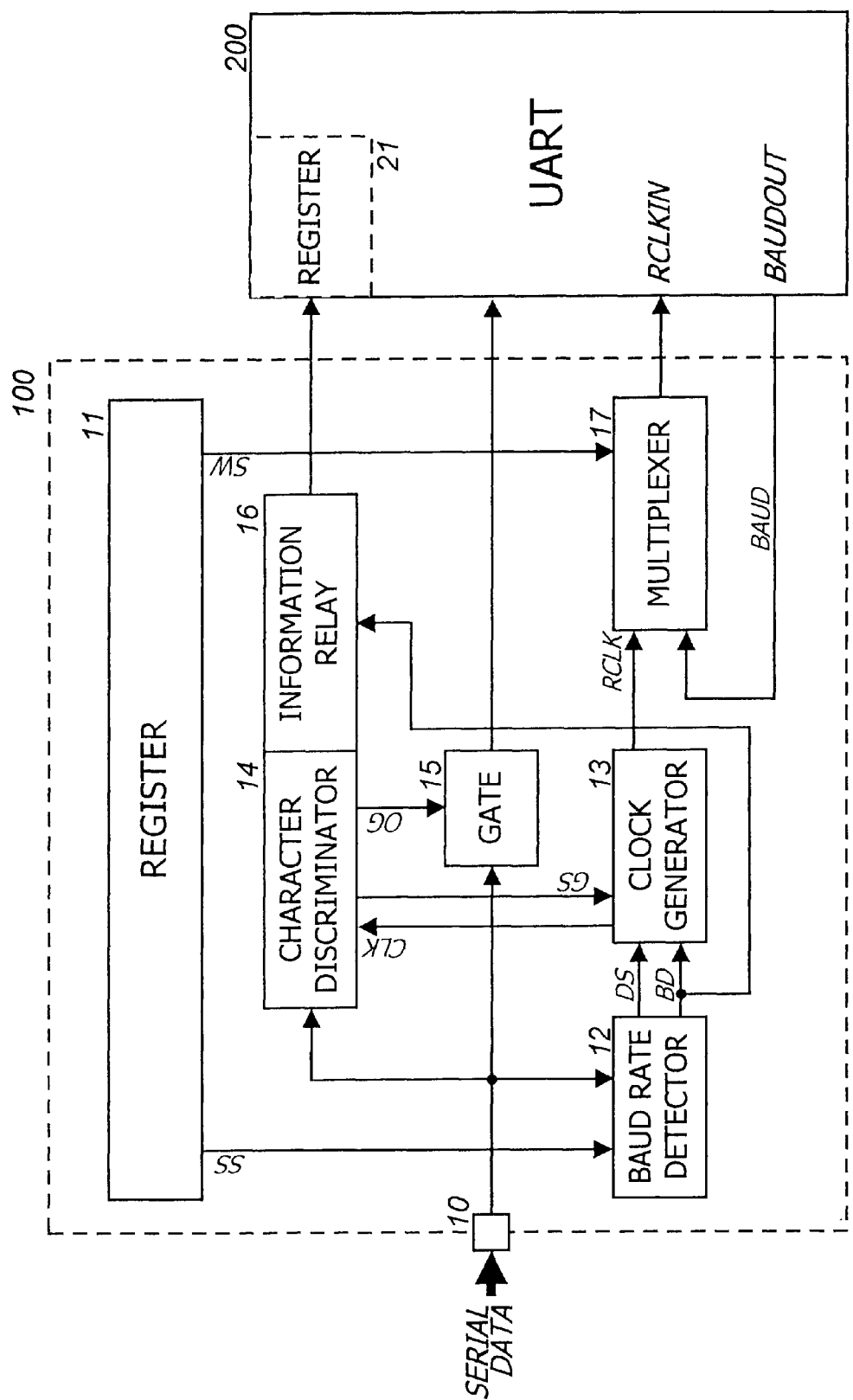
FIG. 1 is a block diagram showing the structure of an AT command receiver according to a first embodiment of the present invention.

FIG. 1 is a block diagram showing the structure of an AT command receiver 100 according to the first embodiment. The AT command receiver 100 receives externally supplied serial data. Upon the reception of the serial data, the AT command receiver 100 discriminates baud rate, parity type (even parity, odd parity, no parity), and generates clock signals (described later) based on the baud rate. The AT command receiver 100 also controls data transfer to an UART (Universal Asynchronous Receiver-Transmitter) 200.

As shown in FIG. 1, the AT command receiver 100 comprises an input terminal 10, a register 11, a baud rate detector 12, a clock generator 13, a character discriminator 14, a gate 15, an information relay 16, and a multiplexer 17.

The UART 200 is a known receiver-transmitter for serial data employing start-and-stop system. That is, the UART 200 receives the serial data supplied from the AT command receiver 100 in accordance with the detected baud rate/parity type and generated clock signals. The UART 200 comprises a register 21 for storing information representing data communication property, that is, the baud rate, parity type, and data format given by the AT command receiver 100. The UART 200 generates a clock signal BAUD to be utilized for the serial data reception, based on the information stored in the register 21.

Functions of the components in the AT command receiver 100 will now be described in detail.

The input terminal 10 receives externally supplied serial data.

The register 11 stores various instructions given by a CPU (not shown).

The baud rate detector 12 starts to monitor serial data input through an input terminal 10 when the CPU supplies a start signal SS which instructs to start AT command reception to the register 11. In response to detection of a start bit of an input AT command, the baud detector 12 supplies a detection signal DS to the clock generator 13. Simultaneously, the baud detector 12 measures pulse width of the stat bit by a built-in counter to detect the baud rate of the input serial data. After the detection, the baud rate detector 12 provides the clock generator 13 and the information relay 16 with a baud data BD indicating the detected baud rate.

The clock generator 13 generates a clock signal CLK for internal operations, in response to the reception of the detection signal DS given by the baud rate detector 12. The generated clock signal CLK is supplied to the character discriminator 14. Cycle of the clock signal CLK is adjusted so as to be equal to the baud rate detected by the baud rate detector 12. This adjustment is carried out for successfully sampling the serial data input through the input terminal 10. The clock generator 13 also generates another clock signal RCLK to be utilized for receiving the serial data. The clock signal RCLK is generated based on the baud rate data BD given by the baud data detector 12, when the clock generator 13 receives from the character discriminator 14 an instruction signal GS which instructs the clock generator 13 to generate the clock signal RCLK. The generated clock signal RCLK is adjusted so as to have appropriate transfer rate suitable for receiving the serial data at the detected baud rate (rate which is 16 times as faster as the baud rate may be appropriate one). And then, the clock signal RCLK is supplied to the UART 200.

The character discriminator 14 discriminates characters represented by the serial data, in response to reception of the clock signal CLK given by the clock generator 13. The character discriminator 14 can discriminate the following five characters: "A" (41h in ASCII code); "T" (54h in ASCII code); "a" (61h in ASCII code); "t" (74h in ASCII code); and <CR> (carriage return: 0dh in ASCII code). That is, the character discriminator 14 discriminates whether the input character represents AT command or not. When an AT command is input, that is, the first and second characters are "AT" or "at", the character discriminator 14 discriminates parity type and data format based on parity bits in the data bits for the first and second characters.

More precisely, the character discriminator 14 comprises a built-in circuit (not shown) for detecting AT commands, and the discrimination whether the AT command is input or not is performed based on status of the detection circuit represented by 2-bit digital signals. The signal indicates "00" at initial stage. In other words, "00" represents a standby mode for AT command reception. Other statuses are as follows: "01" represents a standby mode for character "t"; "10" represents a standby mode for character "T"; and "11" represents an AT command receiving mode. Upon discrimination that the input serial data represent AT command, the character discriminator 14 supplies a later-described signal OG opens the gate 15. Simultaneously, the character discriminator 14 provides the clock generator 13 with the instruction signal GS for generating the clock signal RCLK.

The gate 15 controls data supply to the UART 200. That is, the gate 15 transfers the input serial data to the UART 200 while the gate open signal OG is being supplied, while the data transfer is prohibited during intervals of the signal supply.

The information relay 16 receives the baud rate detected by the baud rate detector 12, and parity type and data format detected by the character discriminator 14, and stores them on the register 21 in the UART 200. The multiplexer 17 selects one of the clock signals RCLK (from the clock generator 13) and BAUD (from the UART 2) in accordance with a clock switch signal SW, and supplies the selected clock signal to a clock signal input terminal RCLKIN of the UART 2.

Operations of the AT command receiver 100 will now be described with reference to a flowchart shown in FIGS. 2A and 2B.

When the CPU (not show) provides the register 11 with the start signal SS, the baud rate detector 12 starts to monitor signal level of the input serial data (step S100). Since the signal at the input terminal 10 shows high level while the data supply is null, the baud rate detector 12 can detect data supply by monitoring low level signal. The clock switch signal SW is also given to the register 11 together with the start signal SS. In this state, the stored clock switch signal SW causes the multiplexer 17 to select the clock signal RCLK generated by the clock generator 13.

When the baud rate detector 12 detects low level signal in the received serial data, that is, a stat bit of a first character arrives the input terminal 10, the baud rate detector 12 outputs a detection signal DS to the clock generator 13 and detects pulse width of the start bit by the built-in counter (step S101). Upon reception of the detection signal DS, the clock generator 13 generates a clock signal CLK and supplies it to the character discriminator 14 (step S102). The clock signal CLK invokes the character discriminator 14 to discriminate characters represented by data bits following to the start bit (step S103).

If it is discriminated at step S103 that the received character is other than "A" and "a", the flow returns to step S100, and the baud rate detector 12 continues signal level monitoring.

On the contrary, if it is discriminated at step S103 that the received character is "A" or "a", the flow forwards to step S104 to start baud rate detection.

Before performing the baud rate detection, status mode of the AT command detection circuit is shifted to "01" when the character is "a". Or, when the character is "A", the mode is shifted to "10". The data bit representing "A" or "a" (61h or 41h) and a parity bit following to the data bit are stored in the character discriminator 14.

In step S104, the baud rate detector 12 detects the baud rate of the input serial data based on the detected pulse width of the start bit. And then, the baud rate detector 12 writes the baud rate data BD representing the detected baud rate on memories in the clock generator 13 and the information relay 16.

The character discriminator 14 discriminates a character following to the first character (step S106), and carries out the following procedures in accordance with the discriminated character.

(1) First Character is "A":

If it is discriminated at step S106 that the second character is other than "T" the flow forwards to step S107. If it is discriminated that the second character is "T", the data bit representing "T" (54h) and a parity bit are stored in the character discriminator 14, and the flow forwards to step S108. At that time, the status mode of the AT command detection circuit is shifted to "11".

(2) First Character is "a":

If it is discriminated at step S106 that the second character is other than "t", the flow forwards to step S107. If it is discriminated that the second character is "t", the data bit representing "t" and a parity bit are stored in the character discriminator 14, and the flow forwards to step S108. The status mode of the AT command detection circuit is shifted to "11".

Accordingly, the flow forwards to step S107 when the second character is other than "T" or "t". In step S107, the character discriminator 14 performs the following processing in accordance with the second character discriminated at step S106 whether "A" or "a".

(1) Second Character is "A" or "a":

If it is discriminated at step S106 that the second character is "A" or "a", the character discriminator 14 stores data bit of the second character (41h or 61h) and a parity bit, and further performs the following processing in accordance with the first character whether "a" or "A".

(1-1) First character is "a":

If the second character discriminated at step S107 is also "a", the flow returns to step S106 to discriminate the following character. In this case, the status mode is remained, that is, mode 01. If the second character discriminated at step S107 is "A", the flow also returns to step S106, but the status mode is shifted to "10".

(1-2) First character is "A":

If the second character discriminated at step S107 is also "A", the flow returns to step S106 to discriminate the following character. In this case the status mode is remained, that is, mode 10. If the second character discriminated at step S107 is "a", the flow also returns to step S106, but the status mode is shifted to "01".

(2) Second Character is Neither "A" nor "a":

If it is discriminated at step S107 that the second character is neither "A" nor "a", the flow returns to step S100 regardless of the first character whether "a" or "A". The status mode is shifted to "00".

Figure 3:
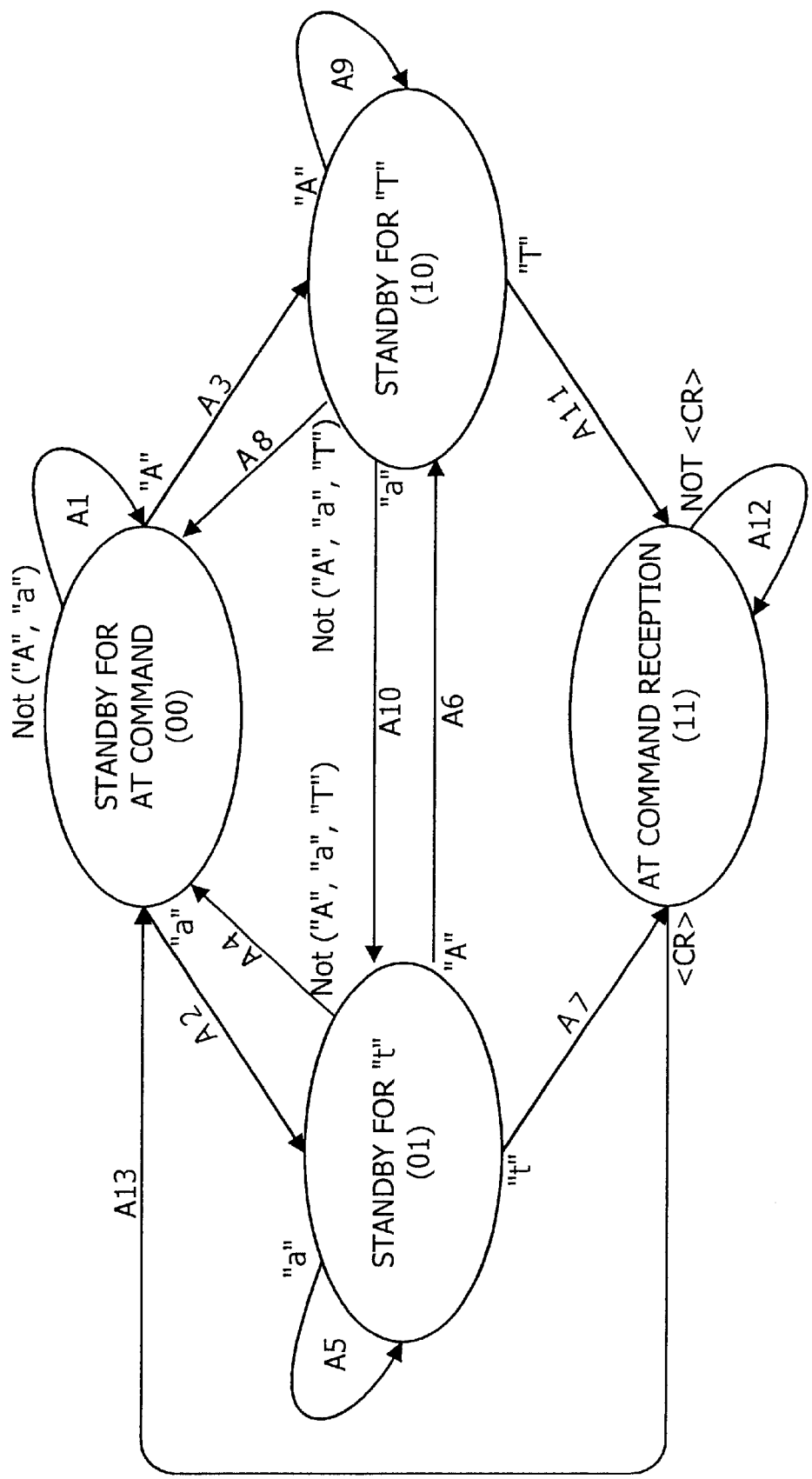
FIG. 3 is a diagram showing a state of mode shift during AT command reception procedure performed by the AT command receiver.

Accordingly, it is discriminated whether an AT command is received through the above described discrimination steps S103, S106 and S107. FIG. 3 is a diagram showing a state of status mode shift at steps S103, S106 and S107.

During the status mode is "00", that is, standby for AT command arrival, the character discriminator 14 waits for arrival of "A" or "a" (shown by an allow A1 in FIG. 3). If the character discriminator 14 receives character "a", the status mode is shifted to "01" (shown by an arrow A2 in FIG. 3). In case of "A" arrival, the status mode is shifted to "10" (shown by an arrow A3 in FIG. 3).

If a character other than "a", "A" and "t" is received during the status mode "01" (standby for "t"), the status mode is shifted to "00" (shown by an arrow A4 in FIG. 3). In case of "a" arrival, the status mode is unchanged (shown by an arrow A5 in FIG. 3). In case of "A" arrival, the status mode is shifted to "10" (shown by an arrow A6 in FIG. 3). If "t" is received, the status mode is shifted to "11" (shown by an arrow A7 in FIG. 3), thus, the AT command reception is established.

In the same manner, if a character other than "a", "A" and "t" arrives during the status mode "10", the status mode is shifted to "00" (shown by an arrow A8 in FIG. 3). In case of "A" arrival, the status mode is unchanged (shown by an arrow A9 in FIG. 3). In case of "a" arrival, the status mode is shifted to "01" (shown by an arrow A10 in FIG. 3). If "T" is received, the status mode is shifted to "01" (shown by an arrow A11 in FIG. 3), thus, the AT command reception is established.

Once the status mode is shifted to "11", the mode is unchanged until data bit 0dh representing <CR> (carriage return) arrives. Upon reception of <CR>, the status mode is shifted to "00" to stand by for next character arrival.

Figure 2A:
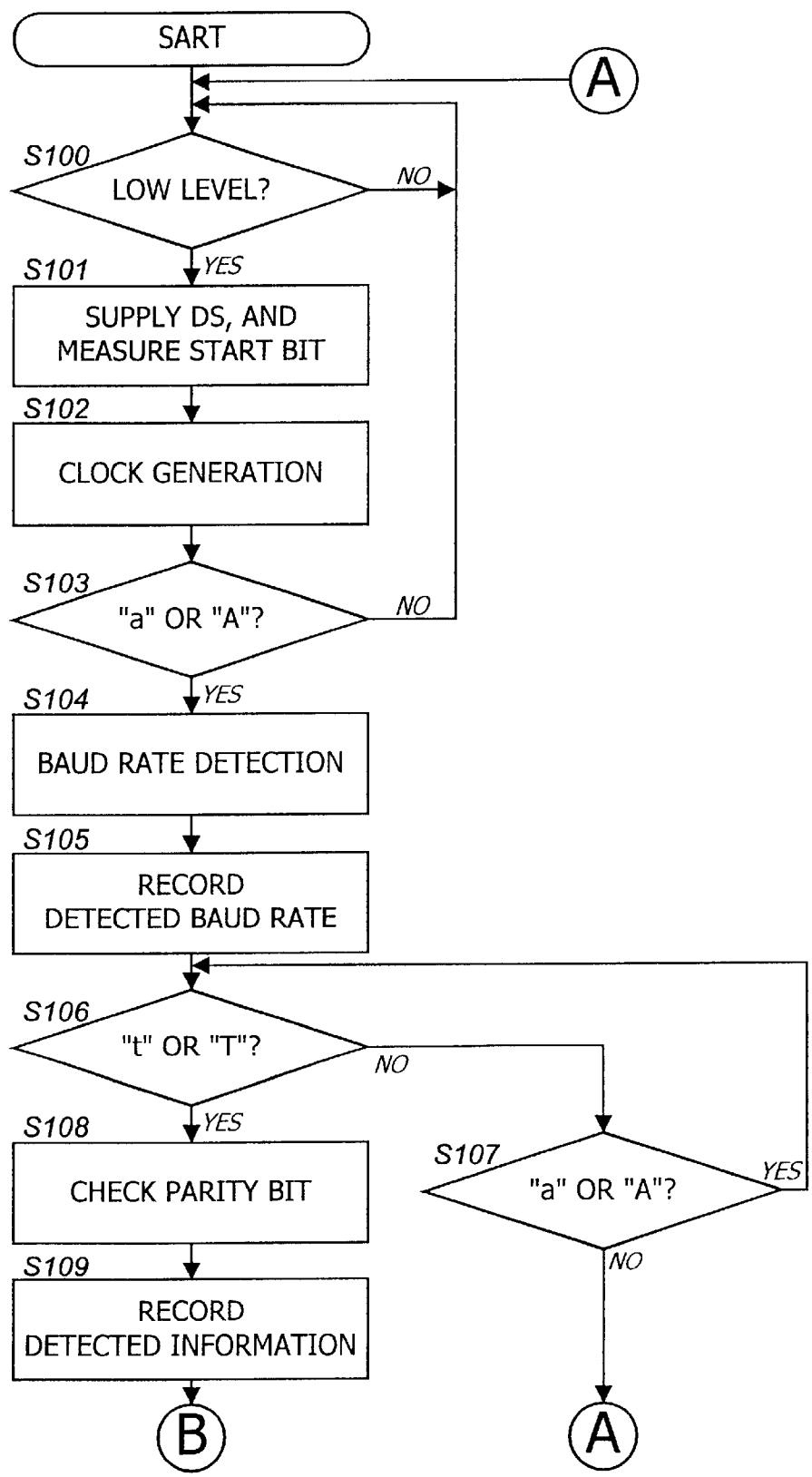
FIGS. 2A and 2B are flowcharts showing steps of processing executed by the AT command receiver.

After the AT command input is discriminated at step S106 in FIG. 2A, the character discriminator detects parameters of the data based on parity bits in the data packets for the stored first and second characters ("AT" or "at"). In this case, parameters representing data format for the present session and parity type (even parity, odd parity, or no parity).

More precisely, the parameter discrimination is carried out in accordance with conditions in the following table 1 when the first and second characters are "AT".

TABLE 1

| Parity Bit | | Parity | |
| --- | --- | --- | --- |
| "A" | "T" | Type | Data Format |
| L | H | Even | 1 Start Bit, 7 Data Bits, 1 Parity Bit, 1 Stop Bit |
| H | L | Odd | 1 Start Bit, 7 Data Bits, 1 Parity Bit, 1 Stop Bit |
| H | H | None | 1 Start Bit, 7 Data Bits, 2 Stop Bits |
| L | L | None | 1 Start Bit, 8 Data Bits, 1 Stop Bit |

And, the parameter discrimination is carried out in accordance with conditions in the following table 1 when the first and second characters are "at".

TABLE 2

| Parity Bit | | Parity | |
| --- | --- | --- | --- |
| "a" | "t" | Type | Data Format |
| H | L | Even | 1 Start Bit, 7 Data Bits, 1 Parity Bit, 1 Stop Bit |
| L | H | Odd | 1 Start Bit, 7 Data Bits, 1 Parity Bit, 1 Stop Bit |
| H | H | None | 1 Start Bit, 7 Data Bits, 2 Stop Bits |
| L | L | None | 1 Start Bit, 8 Data Bits, 1 Stop Bit |

Then, the character discriminator 14 writes the data format and parity information detected at step S108 on the memory in the information relay 16 (step S109).

Figure 2B:
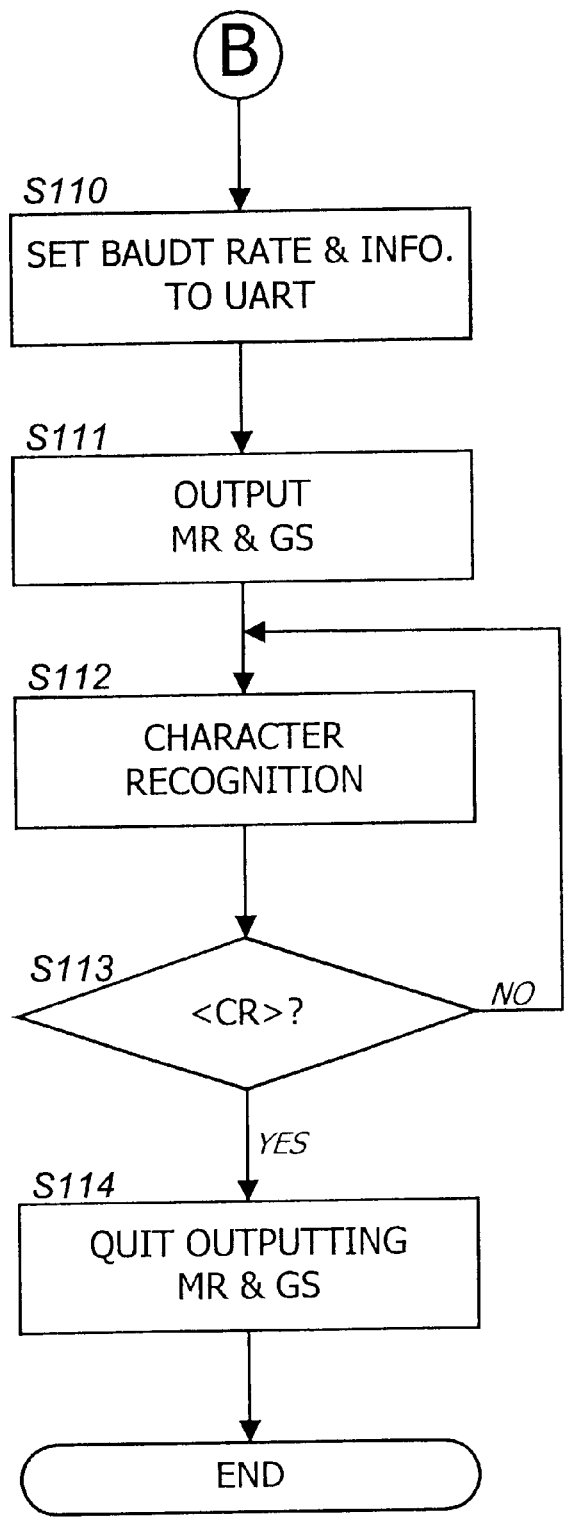

The information relay 16 transfers the baud rate, and the data format and parity information in its memory to the register 21 in the UART 200 (step S110 in FIG. 2B). The UART 200 generates a clock signal BAUD based on the transferred baud rate.

The character discriminator 14 outputs the instruction signal GS to the clock generator 13 for clock signal generation (step S111). Simultaneously, the character discriminator 14 also outputs the gate open signal OG to the gate 15 (step S111). Upon reception of the instruction signal GS, the clock generator 13 generates the clock signal RCLK for the data reception, and outputs the generated clock signal RCLK to the multiplexer 17. In response to the gate open signal OG, the gate 15 allows data flow of the serial data from the input terminal 10 to the UART 200. In this case, the multiplexer 17 selects the clock signal RCLK supplied by the clock generator 13 in accordance with the clock switch signal SW, and outputs the clock signal RCLK to the UART 200.

Upon reception of the clock signal RCLK, the UART 200 accepts the received serial data provided through the gate 15 in accordance with the data format information stored in the register 21. The serial data accepted by the UART 200 at that time are commands following to the AT command, that is, characters following to the first and second characters "AT" or "at". Those characters represent commands to be processed by the CPU.

The character discriminator 14 still continues character recognition on thus received serial data (step S112). When data bits representing carriage return (0dh) arrive (YES at step S113), the status mode of the AT command detection circuit is shifted to "00", and the character discriminator 14 quit outputting the instruction signals GS and gate open signal OG (step S114). Thus, the clock generator 13 quit generating the clock signal RCLK for the data reception, and the gate 15 is closed to quit transferring the serial data to the UART 200. Since the gate 15 is closed, the UART 200 terminates its operation, and the AT command receiver 100 stands by for next arrival of an AT command, that is, the present receiving session is completed.

As described above, the AT command receiver according to the first embodiment of the present invention, the UART can receive the transfer information, that is, baud rate, parity information, and data format information directly from the AT command receiver 100 without CPU processing. As a result, successful data reception without delay is realized. Moreover, since process tasks of the CPU are reduced, power consumption will be saved.

The clock signal for the data reception is not supplied to the UART during receiving the first and second characters for the AT command, and after the carriage return is received. Therefore, more effective power saving is realized. Furthermore, since the UART receives baud rate and data transfer information detected based on the received AT command, the parity information set to the UART is the same as that of data sender. That is, the receiver can perform parity check for characters following to the AT command.

In the above description, although the clock switch signal SW allows the multiplexer 17 to select only the clock signal supplied by the clock generator 13, the clock switch signal SW may allow the multiplexer 15 to select the clock signal BAUD generated by the UART 200. More precisely, the information relay 16, for example, outputs an interruption signal to the CPU after the relay 16 completes the information transfer to the register 21, and the CPU changes the clock switch signal SW upon reception of the interruption signal.

Since this structure allows the UART 200 to receive the serial data following to the AT command in accordance with the clock signal generated by the UART 200 itself, the clock generator 13 can rest while the data reception. This structure is also helpful for saving power consumption. Moreover, the clock switch signal may be changed by, for example, the AT command receiver 100 instead of the CPU. In this case, the information relay 16 may output the above described interruption signal to the multiplexer 17, and the multiplexer 17 may select the clock signal BAUD upon reception of the interruption signal.

Second Embodiment

An At command receiver according to a second embodiment will now be described with reference to the accompanying drawings.

Figure 4:
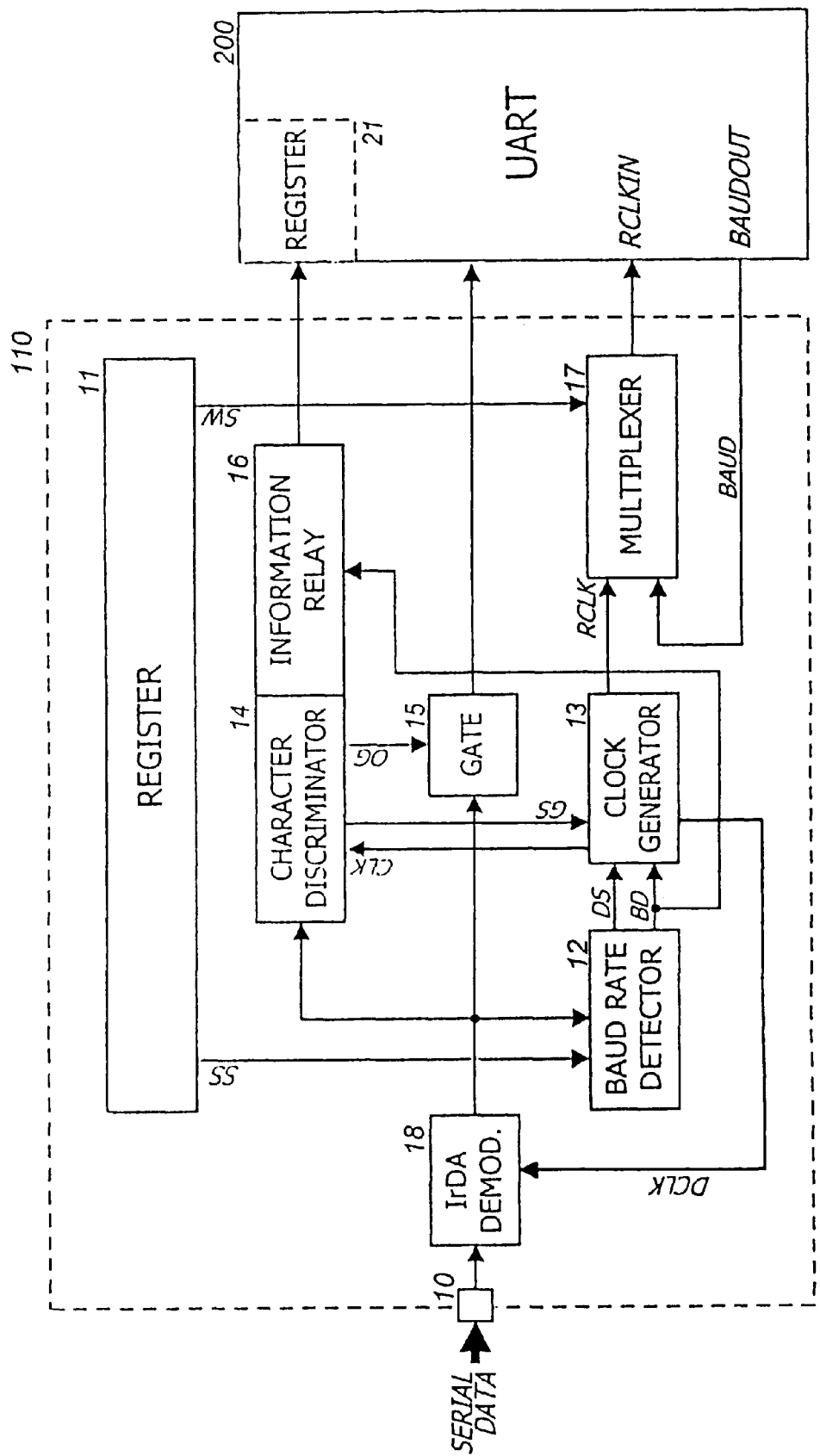
FIG. 4 is a block diagram showing the structure of an AT command receiver according to a second embodiment of the present invention.

FIG. 4 shows the structure of an AT command receiver 110 according to the third embodiment featuring infrared signal reception. Since data communication by the infrared signal is usually standardized by IrDA (Infrared Data Association), hereinafter.a term IrDA means the infrared signal. The basic structure of the AT command receiver 110 is the same as that of the AT command receiver 100 described in the first embodiment (FIG. 1). The different between them is an additional component called IrDA demodulator 18 in the AT command receiver 110. In this structure, the clock generator 13 generates an additional clock signal specialized for IrDA modulation (described later). The UART of this embodiment is the same as that described in the first embodiment. Like or same reference numeral as used in FIG. 1 is also used in FIG. 4 to denote corresponding or identical components.

In the same manner described in the first embodiment, the baud rate detector 12 starts to monitor signal level of received serial data in response to the start signal SS given by the CPU (not shown). Upon detection of a low level signal, the baud rate detector 12 provides the clock generator 13 with the detection signal DS. In response to the detection signal DS, the clock generator 13 generates the clock signal CLK for the internal operations and another clock signal DCLK for IrDA demodulation. The generated clock signal CLK is supplied to the character discriminator 14 while the clock signal DCLK is supplied to the IrDA demodulator 18.

Figure 5:
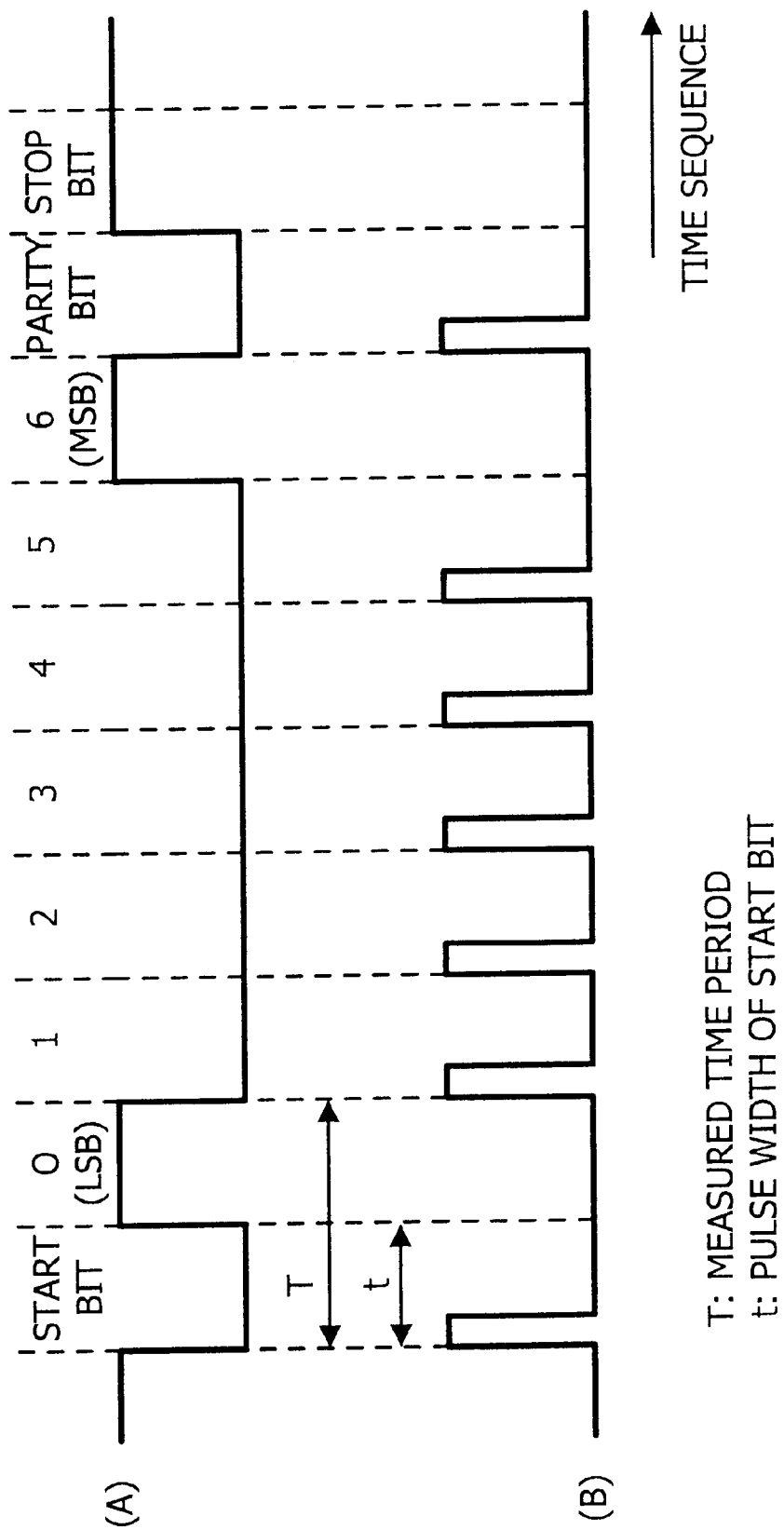
FIG. 5 is a diagram showing relationship between serial data and an IrDA pulse signal.

A signal input to the IrDA demodulator 18 is a pulse signal after direct conversion from received infrared rays (hereinafter, referred to as an IrDA pulse signal). Pulses in the IrDA pulse signal represent status of the received serial data. In this case, the pulse width of the IrDA pulse signal is as $3/16$ times as wide as baud rate width, and the pulses indicate low level status of the serial data. For example, if a sender sends the serial data representing a character "A" shown by (A) in FIG. 5, the IrDA demodulator 18 receives the IrDA pulse signal shown by (B) in FIG. 5 which represents the serial data.

In this structure, the IrDA pulse signal input to the IrDA demodulator 18 is directly output during intervals of signal supply of the clock DCLK. Therefore, the baud rate detector 12 detects the baud rate based on, for example, the pulse signal (B) shown in FIG. 5. Since the AT command shows low-level first bit (start bit), high-level second bit (LSB in data bits), and low-level third bit (second bit in data bits), the baud detector 12 measures a time period between rising edge of the first pulse and next rising edge of the pulse (B) shown in FIG. 5, and divides the measured time period in half to obtain the baud rate.

While the clock signal DCLK is being supplied to the IrDA demodulator 18, the received IrDA pulse signal is expanded by the IrDA demodulator 18, thus, the IrDA pulse signal is demodulated to original serial data. That is, when the IrDA demodulator 18 receives the IrDA pulse signal shown by (B) in FIG. 5, the IrDA demodulator 18 demodulates it to the serial data shown by (A) in FIG. 5.

Thus demodulated IrDA pulse signal is subjected to the AT command detection processing in the same manner described in the first embodiment.

According to this embodiment, the baud detector 12 can detect the baud rate of the received serial data based on the IrDA pulse signal, thus the AT command receiver of the present invention is applicable to the IrDA data communication.

Third Embodiment

A third embodiment of the present invention will now be described with reference to the accompanying drawings.

Figure 6:
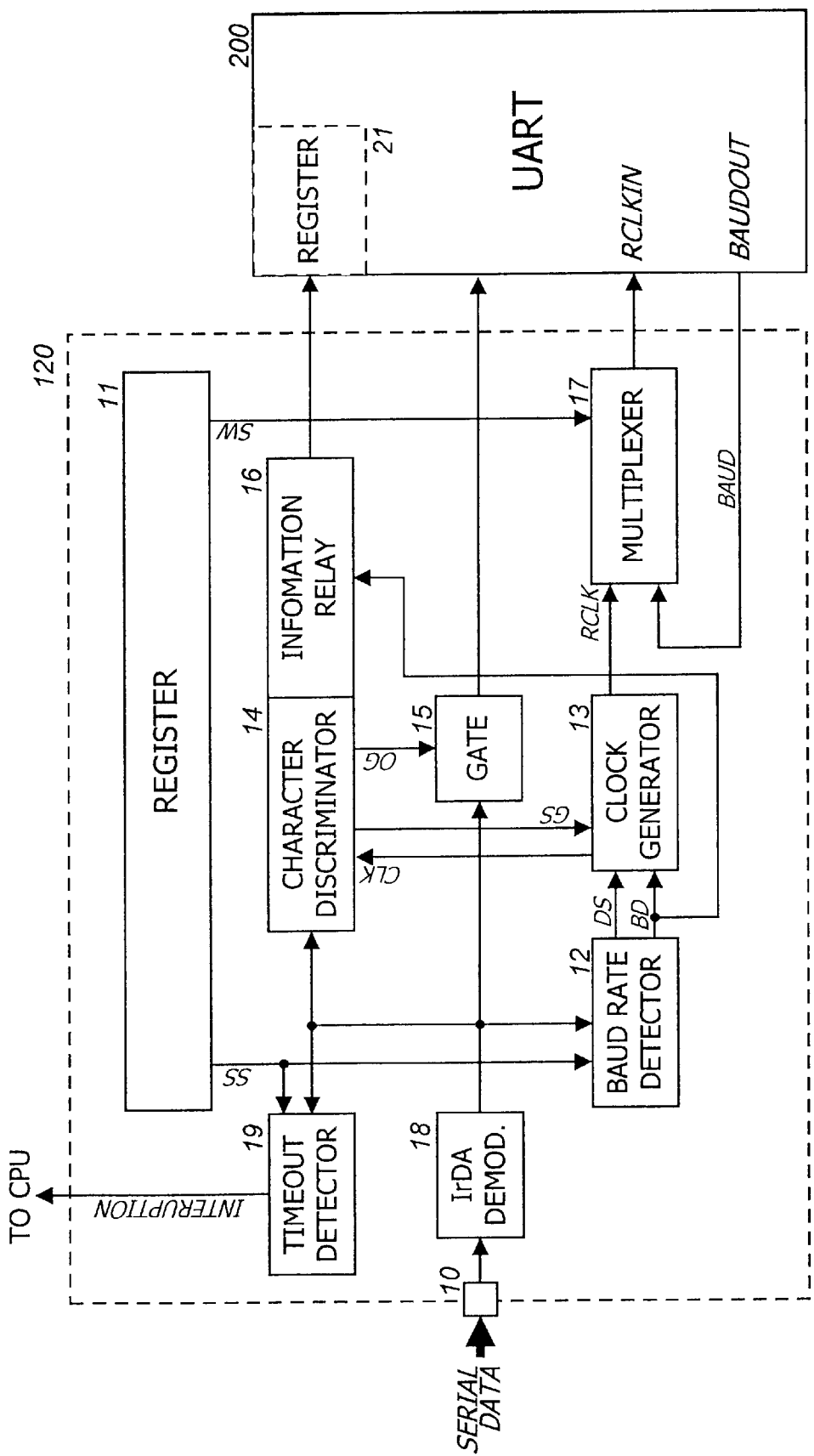
FIG. 6 is a block diagram showing the structure of an AT command receiver according to a third embodiment of the present invention.

FIG. 6 is a block diagram showing the structure of an AT command receiver according to the third embodiment. In this embodiment, an AT command receiver 120 comprises a timeout detector 19 in addition to the structure of the AT command receiver 110 in the second embodiment, and the UART of this embodiment is the same as that of the first and second embodiments. Like or same reference numeral as used in FIG. 4 is also used in FIG. 6 to denote corresponding or identical components.

The timeout detector 19 monitors data output from the IrDA demodulator 18 while counting time lapse, in response to the start signal SS is given to the register 11 from the CPU (not shown). The timeout detector 19 discriminates whether the demodulated serial data are output from the IrDA demodulator 18 within a predetermined time period since count started. If the data output is not detected within the predetermined time period, the timeout detector 19 generates an interruption signal and sends it to the CPU.

Figure 7:
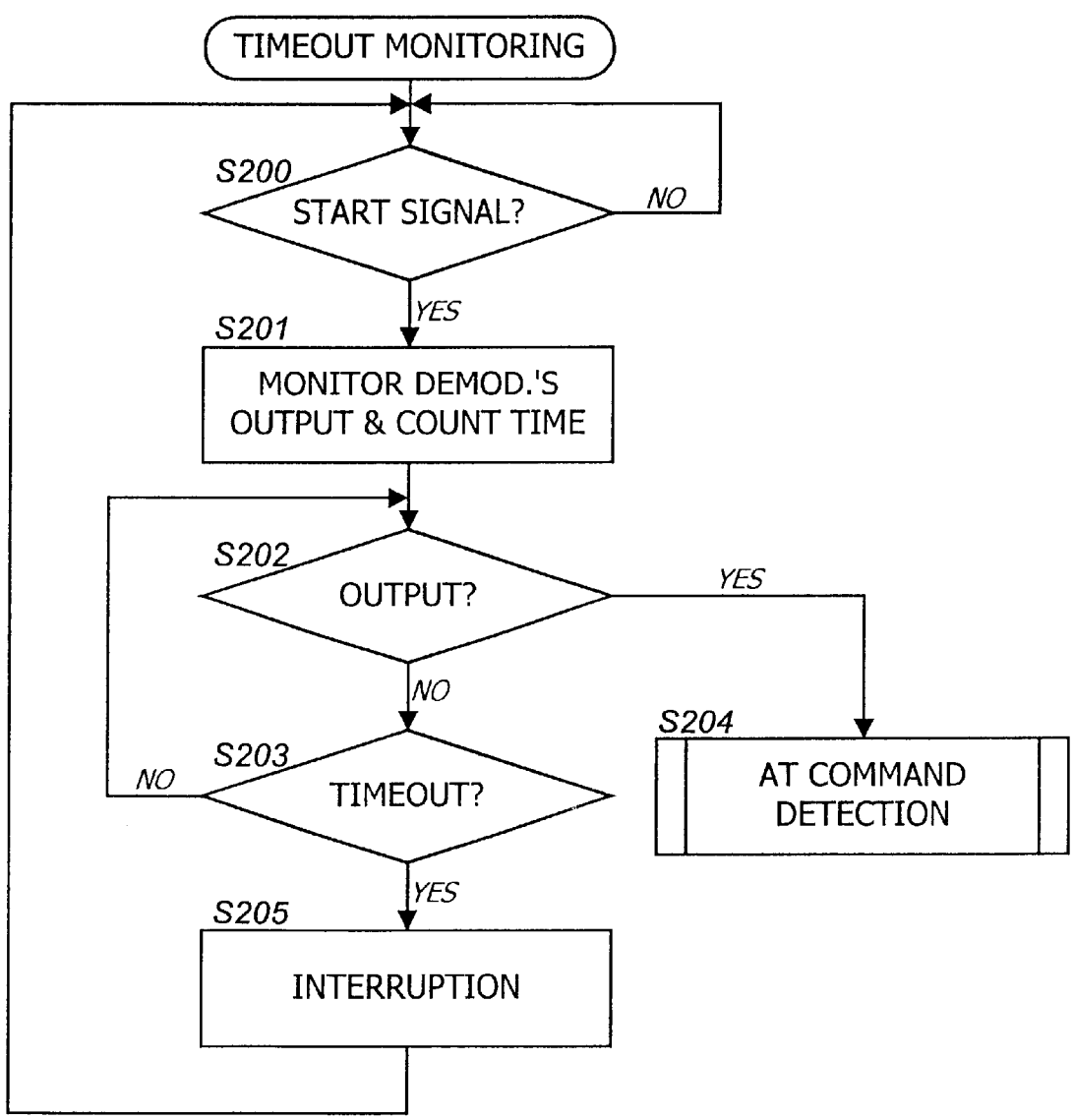
FIG. 7 is a flowchart showing steps of timeout detection processing according to the second embodiment of the present invention.

The timeout detection process will now be described with reference to FIG. 7.

When the CPU provides the register 11 with the start signal SS (step S200), the timeout detector 19 starts monitoring whether the modulated data is output from the IrDA demodulator 18 or not, simultaneously with counting time (step S201). More precisely, the timeout detector 19 monitors whether the serial data are output from the IrDA demodulator 18, while comparing the lapsed time period with a predetermined time period at predetermined intervals.

If the IrDA demodulator 18 outputs the serial data within the predetermined time period (YES at step S202), the flow forwards to step S204 to perform the AT command detection (steps after S101 in FIG. 2A) described in the first embodiment.

On the contrary, if the lapsed time period reaches the predetermined time period before the serial data output (YES at step S203), the timeout detector 18 generates an interruption signal and sends it to the CPU (step S205). Upon reception of the interruption signal, the CPU quit providing the start signal SS, thus, the AT command detection processing rests until next start signal SS is given.

As described above, the timeout detector 19 detects whether the serial data are output from the IrDA demodulator 18 within the predetermined time period or not, before the AT command detection is performed. That is, if a period of data null exceeds the predetermined time period, the AT command detection is canceled. As a result, extra power consumption during standing by for the data arrival is reduced.

The AT command receiver according to the first embodiment may comprise the timeout detector featured in the third embodiment.

Each of the AT command receivers according to the above embodiments may comprise a plurality of input terminals for different communication type such as cable communication, IrDA communication, radio wave communication, and the like.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A method of detecting data communication property which is applicable to a device for receiving serial data and transferring the received serial data to a connected universal asynchronous receiver-transmitter, said method comprising:
    receiving the serial data;
    discriminating whether the serial data include an AT command;
    detecting data communication property including baud rate of the received serial data, parity type, and data format, based on the received AT command;
    generating a clock signal for receiving the serial data based on the detected baud rate and supplying the generated clock signal to said universal asynchronous receiver-transmitter;
    setting the detected data communication property to said universal asynchronous receiver-transmitter;
    monitoring whether the serial data is received while measuring a time period from a receipt of a start signal; and
    quitting the baud rate detection when the measured time period exceeds a predetermined time period.

2. The method according to claim 1, wherein said detecting comprises detecting first and second characters represented by the serial data to discriminate whether input characters of said serial data represent the AT command; and
    checking parity bits for the first and second characters of the AT command to detect the parity type and the data format based on level of the parity bits, and
    said generating generates the clock signal when said discriminating discriminates that the input characters represent the AT command, and quits generating the clock signal when said discriminating discriminates a last character of the AT command.

3. A device for detecting data communication property which receives serial data and transfers the received serial data to a connected universal asynchronous receiver-transmitter, said device comprising;
    at least one input terminal which receives externally supplied start-and-stop serial data;
    a character discriminator which discriminates whether input characters in the received serial data represent the AT command;
    a baud rate detector which detects, if said character discriminator discriminates that the input characters represent the AT command, a first data communication property including baud rate of the received serial data by measuring a start bit for a first character of the AT command in the received serial data;
    a clock generator which generates a clock signal for data reception based on the detected baud rate, and supplies the generated clock signal to said universal asynchronous receiver-transmitter;
    a property detector which detects, if said character discriminator discriminates that the input characters represent the AT command, a second data communication property including parity type and data format of the received serial data, based on the AT command;
    an information relay which receives information representing the first and second communication properties from said baud rate detector and said property detector, and sets the received information to said universal asynchronous receiver-transmitter; and
    a gate which stops flow of the serial data to said universal asynchronous receiver-transmitter while the first and second characters of the AT command are being input.

4. The device according to claim 3, wherein said character discriminator detects first and second characters represented by the serial data to discriminate whether the input characters represent the AT command, and said property detector checks parity bits for the first and second characters of the AT command to detect the second data communication property based on level of the parity bits.

5. The device according to claim 3, wherein said character discriminator supplies an instruction signal to said clock generator to generate said clock signal for data reception when said character discriminator discriminates that the received serial data represent the AT command, and said character discriminator quits supplying the instruction signal and discriminates whether a further AT command is received when said character discriminator detects a last character of the AT command; and said clock generator generates the clock signal for the data reception in response to the instruction signal supplied by said character discriminator, and quits generating the clock signal when the supply of the instruction signal is stopped.

6. The device according to claim 3 further comprising a timeout detector which monitors whether the serial data is supplied while measuring a time period during an interval of the data supply, and controls said baud rate detector to quit the baud rate detection when the measured time period exceeds a predetermined time period.

7. The device according to claim 4 further comprising a timeout detector which monitors whether the serial data is supplied while measuring a time period during an interval of the data supply, and controls said baud rate detector to quit the baud rate detection when the measured time period exceeds a predetermined time period.

8. The device according to claim 5 further comprising a timeout detector which monitors whether the serial data is supplied while measuring a time period during an interval of the data supply, and controls said baud rate detector to quit the baud rate detection when the measured time period exceeds a predetermined time period.

9. A method of detecting data communication property which is applicable to a device for receiving serial data and transferring the received serial data to a connected universal asynchronous receiver-transmitter, said method comprising:

receiving an infrared signal representing the serial data;

demodulating the infrared signal to output the serial data;

discriminating whether the serial data in the demodulated infrared signal include an AT command;

detecting a data communication property including baud rate of the received serial data, parity type, and data format, based on the received AT command;

generating a clock signal for receiving the serial data and supplying the generated clock signal to the universal asynchronous receiver-transmitter when said discriminating discriminates that the received serial data include the AT command;

setting the detected data communication property to said universal asynchronous receiver-transmitter;

monitoring whether the serial data demodulating by said modulating are output while measuring a time period during an interval of the data output; and quitting the baud rate detection when the measured time period exceeds a predetermined time period.

10. The method according to claim 9, wherein said detecting comprises detecting first and second characters represented by the serial data to discriminate whether input characters of said serial dated represent the AT command; and checking parity bits for the first and second characters of the AT command to detect the parity type and the data format based on level of the parity bits, and said generating generates the clock signal when said discriminating discriminates that the input characters represent the AT command, and quit generating the clock signal when said discriminating discriminates a last character of the AT command.

11. A device for detecting data communication property which receives serial data and transfers the received serial data to a connected universal asynchronous receiver-transmitter, said device comprising;

at least one input terminal which receives an externally supplied infrared signal representing start-and-stop serial data;

a demodulator which demodulates the infrared signal to output the serial data;

a character discriminator which discriminates whether input characters in the received serial data represent the AT command;

a baud rate detector which detects a first data communication property including baud rate of the serial data output by said demodulator;

a clock generator which generates a clock signal for data reception based on the detected baud rate, and supplies the generated clock signal to said universal asynchronous receiver-transmitter;

a property detector which detects, if said character discriminator discriminates that the input characters represent the AT command, a second data communication property including parity type and data format of the received serial data, based on the AT command;

an information relay which receives information representing the first and second data communication properties from said baud rate detector and said property detector, and sets the received information to said universal asynchronous receiver-transmitter, and a gate which stops flow of the serial data to said universal asynchronous receiver-transmitter while the first and second characters of the AT command are being input.

12. The device according to claim 11, wherein said baud rate detector measures a time period between a first pulse and a second pulse of the infrared signal, and divides the measured time period in half to obtain the baud rate;

said character discriminator detects the first and second characters represented by the received serial data to discriminate whether the input characters represent the AT command, and said property detector checks parity bits for the first and second characters of the AT command, and detects said second data communication property including the parity type and the data format based on level of the parity bits.

13. The device according to claim 11, wherein said character discriminator supplies an instruction signal to said clock generator to generate said clock signal for data reception when said character discriminator discriminates that the received serial data represent the AT command, and said character discriminator quits supplying the instruction signal and discriminates whether a further AT command is received when said character discriminator detects a last character of the AT command; and said clock generator generates the clock signal for the data reception in response to the instruction signal supplied by said character discriminator, and quits generating the clock Signal when the supply of the instruction signal is stopped.

14. The device according to claim 11 further comprising a timeout detector which monitors whether said demodulator outputs the serial data while measuring a time period during an interval of the data output, and controls said baud rate detector to quit the baud rate detection when the measured time period exceeds a predetermined time period.

15. The device according to claim 11 further comprising a timeout detector which monitors whether said demodulator outputs the serial data while measuring a time period during an interval of the data output, and controls said baud rate detector to quit the baud rate detection when the measured time period exceeds a predetermined time period.

16. The device according to claim 13 further comprising a timeout detector which monitors whether said demodulator outputs the serial data while measuring a time period during an interval of the data output, and controls said baud rate detector to quit the baud rate detection when the measured time period exceeds a predetermined time period.

* * * * *